United States Patent [19]
Marsh et al.

[11] Patent Number: 5,140,781
[45] Date of Patent: Aug. 25, 1992

[54] GEAR FINISHING PROCESS

[75] Inventors: William L. Marsh, San Jose; Kenneth L. Kaufman, Saratoga, both of Calif.

[73] Assignee: Westinghouse Electric Corp., Pittsburgh, Pa.

[21] Appl. No.: 819,899

[22] Filed: Jan. 13, 1992

[51] Int. Cl.⁵ .............................................. B24B 29/02
[52] U.S. Cl. ................................. 51/281 R; 264/162; 51/287; 51/325
[58] Field of Search ................ 51/281 R, 287, 325, 51/52 R; 264/162

[56] References Cited

U.S. PATENT DOCUMENTS

4,555,871  12/1985  Bloch .................................. 51/52 R

Primary Examiner—Bruce M. Kisliuk
Assistant Examiner—Jack Lavinder
Attorney, Agent, or Firm—D. Schron

[57] ABSTRACT

Reduction of index undulation errors associated with helical gear teeth caused by the grinding process during the manufacture of the gears without degrading other gear accuracies (e.g. profile, tooth spacing) below levels required for precision (AGMA16 or DIN1) gears. A mold of the space between several gear teeth is obtained, with the mold having a length equal to or greater than the wavelength of the undulation error to be reduced. A microfinishing film is affixed to the mold and the mold is placed relative to a gear tooth so that the microfinishing film rests against a tooth surface having the undulation error. The grit size of the microfinishing film is such as to remove approximately 2 to 3 millionths of gear material with each pass through the teeth by the mold. Multiple passes are made by hand until the undulation error is reduced to an acceptable value. During the process the microfinishing film is replaced after approximately 3 or 4 passes and the process is repeated for each tooth of the gear.

6 Claims, 9 Drawing Sheets

GEAR FINISHING PROCESS

BACKGROUND OF THE INVENTION

1. Field of the Invention

The invention in general relates to the field of gear manufacture and in particular to a process which is supplemental to the normal grinding process performed on the gears.

2. Background Information

In the fabrication of large helical gears, such as may be used in ship propulsion systems, after the gear teeth are formed and heat treated, they are subjected to a grinding operation to eliminate slight inaccuracies.

The inaccuracies are extremely small, dimensionally measuring, in some instances, thousandths or even millionths of an inch; however even this amount is sufficient to set up undesirable noises at discrete frequencies. Accordingly, the gear teeth are subjected to a grinding operation to reduce or eliminate the inaccuracies.

A problem arises in the use of large grinding apparatus to reduce the inaccuracies in the helical gears in that the grinding apparatus itself may introduce slight errors, the most prominent of which is known as undulation errors. These errors are the source of both structure-borne and airborne noise which can exceed predetermined limits resulting in unacceptable gear performance, particularly for ship propulsion systems wherein the noise is transmitted through the water and may be detected at great distances.

The post-grinding finishing process of the present invention substantially reduces such undulation errors.

SUMMARY OF THE INVENTION

The present invention provides for a method of finishing a helical ground gear to reduce undulation errors produced by the grinding process in the gear fabrication. In the method, a molding compound is poured over at least one tooth of the gear and into the spaces on either side of the tooth. The mold extends for a distance along the tooth which is equal to or greater than the wavelength of the undulation error to be reduced. The molding compound is allowed to harden and is thereafter removed to thereby obtain a mold of the space between the gear teeth. A sheet of microfinishing film is affixed to the mold, with the microfinishing film being of grit size so as to remove no more than approximately 2 to 3 millionths of an inch of gear material on each pass over a gear tooth.

The mold with the attached microfinishing film is placed between 2 teeth of the gear so that the microfinishing film contacts the tooth surface having an undulation error. Multiple passes of the mold are thereafter made through the space and the microfinishing film is replaced after a predetermined number of passes. Multiple passes and multiple replacement of microfinishing film are made until the undulation error on the tooth surface of the gear tooth in contact with the microfinishing film has been reduced to an acceptable value. Thereafter the same process is repeated for the other teeth of the gear.

BRIEF DESCRIPTION OF THE DRAWINGS

FIGS. 5A-5G are sectional views at various locations through the gear tooth of FIG. 4;

BRIEF DESCRIPTION OF THE PREFERRED EMBODIMENT

Figure 1:
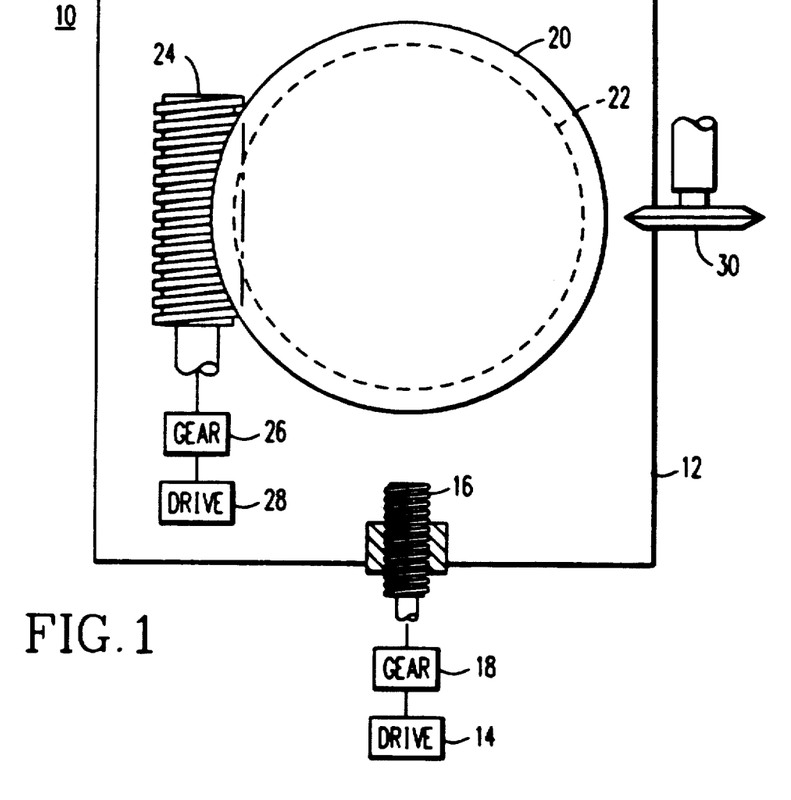
FIG. 1 is a simplified diagrammatic plan view presentation of a grinding machine.

Referring now to FIG. 1 there is illustrated a simplified diagrammatic plan view of a grinding machine, of the type which can accommodate large helical gears such as used in ship propulsion systems. The grinding apparatus 10 includes a tangentially advancing generation or work slide 12 which is linearly moved by the arrangement which includes generating drive 14 coupled to ball screw 16 through gearing 18.

A helical gear to be ground is placed on the rotating machine or work table 20 connected to a worm gear 22 driven by the arrangement including an indexing worm 24 coupled through gearing 26 to an index drive 28. During operation, a movable grinding wheel 30 grinds the finished gear so as to attain a predetermined tolerance.

Undulation errors are the result of slight imperfections in the gearing arrangement of the grinding apparatus 10. The errors change as the gear advances during the grinding operation resulting in a periodic error on the running surface of the gear teeth. The primary undulation error which causes the structureborne and airborne noise is the result of the indexing worm drive arrangement controlling the rotation of the worm gear 22.

Figure 2:
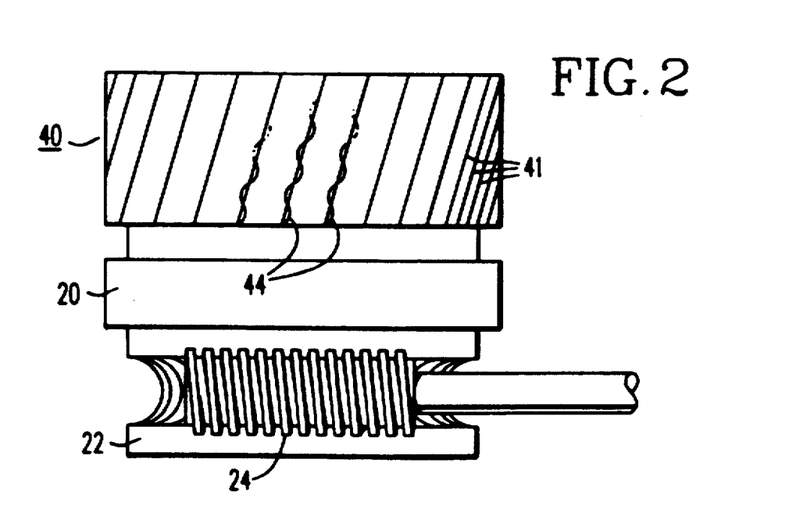
FIG. 2 is a simplified side view presentation of the grinding machine of FIG. 1.

FIG. 2 is a simplified diagrammatic elevational view of the apparatus of FIG. 1, additionally showing the placement of a helical gear 40 which is rotated along with work table 20 during a grinding operation on the helical gear. Sloping lines 41 are simplified representations of the helical gear teeth.

An undesired result of the grinding operation is to put a periodic undulation on the surface of each gear tooth, as represented by undulating lines 44.

The manufacturing and grinding process results in a tooth surface having imperfections and thus deviating from an idealized smooth surface. Many of these imperfections are random and accordingly, when the gear is placed into operation these random imperfections are attenuated by the intermeshing of the gear teeth. Other imperfections are always in phase such that there is no attenuation from simultaneous multiple tooth contact and although these periodic undulations are present they are somewhat minor as compared with the index undulation which is the primary cause of the airborne and structureborne noise. Accordingly, for ease of understanding, the present invention will be described with respect to the elimination of the index undulation error represented by undulating lines 44, which for the present purpose are illustrated as pure sinusoidal waves having a certain wavelength.

The wavelength $\lambda$ of this undulation error may be determined from the following equation:

$$\lambda = \frac{\pi D}{N_W \sin \psi} \quad (1)$$

where

D = the pitch diameter of the gear 40 being ground
$N_W$ = the number of teeth in the worm gear 22
$\psi$ = the helix angle at the pitch diameter of the gear 40

Figure 3:
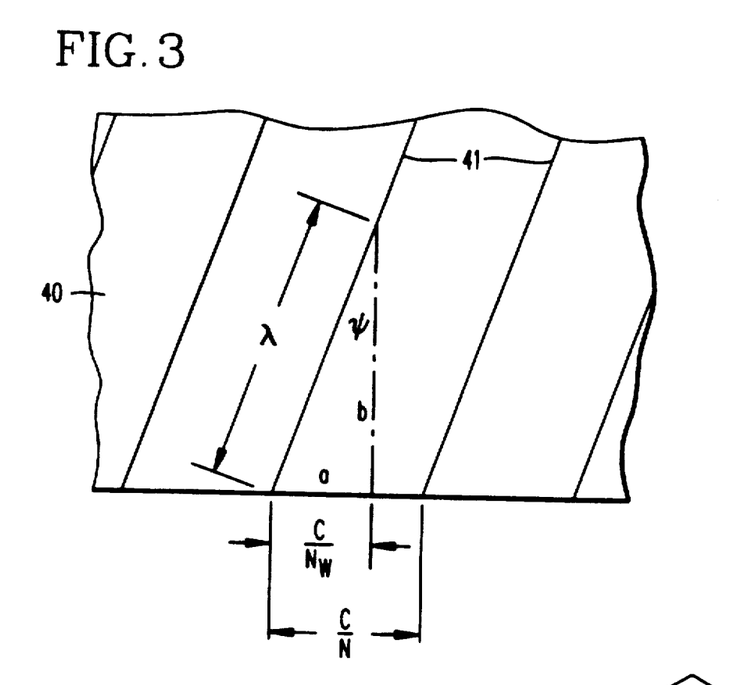
FIG. 3 is a diagram illustrating a portion of a gear, to illustrate certain variables.

This relationship is illustrated in FIG. 3. If C is the circumference of the gear 40 and N the number of gear teeth, then $$\frac{C}{N}$$

is the distance between gear teeth, or between lines 41. If the circumference C is divided by the number of teeth $N_W$ in the worm gear then, by way of example, with $N_W > N$, the resulting distance superimposed upon FIG. 3 would result in a line segment designated a $$\left( a = \frac{C}{N_W} \right)$$

If a vertical line b is projected to intersect line 41, then the resulting hypotenuse of the triangle formed is the wavelength $\lambda$ of the undulation error, where $\lambda$ is measured along the tooth length. That is, from geometry:

$$\sin \psi = \frac{a}{\lambda} = \frac{C}{N_W \lambda} \quad (2)$$

rearranging $$\lambda = \frac{C}{N_W \sin \psi} \quad (3)$$

since $C = \pi D$, $$\lambda = \frac{\pi D}{N_W \sin \psi} \quad (4)$$

which is the same as Equation (1).

Figure 4:
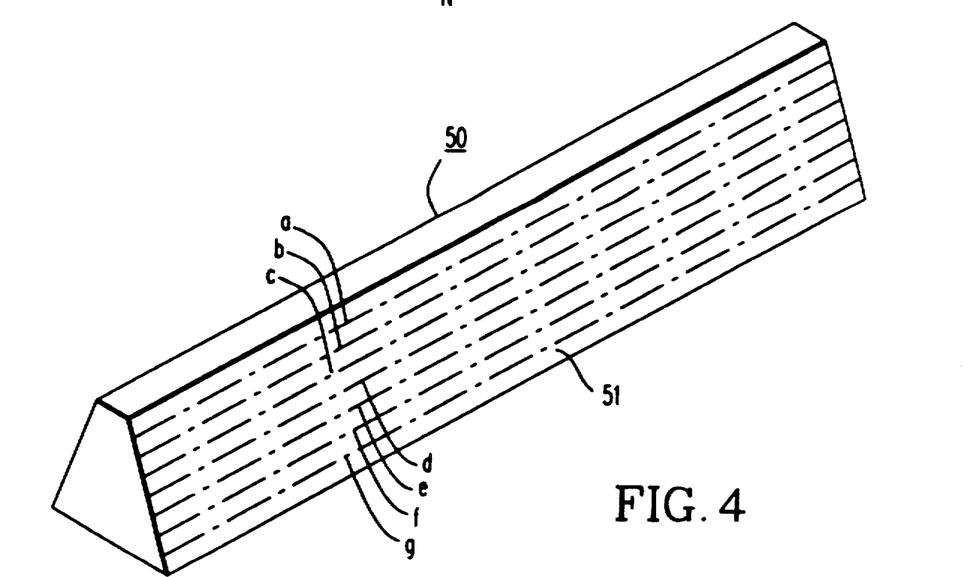
FIG. 4 is a representation of one gear tooth.
Figure 5A:
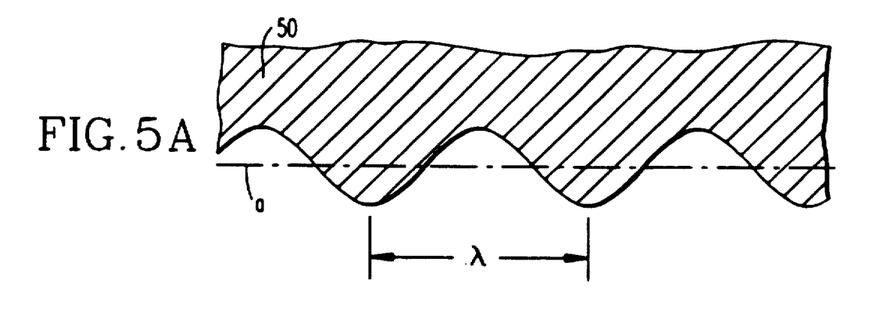
Figure 5B:
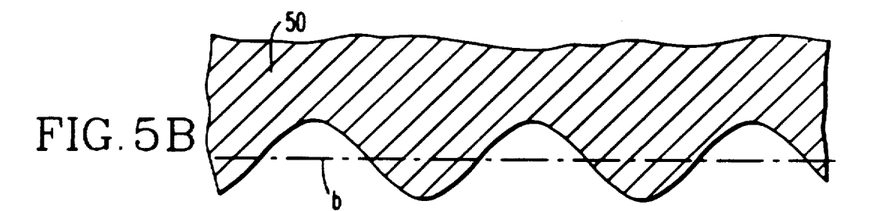
Figure 5C:
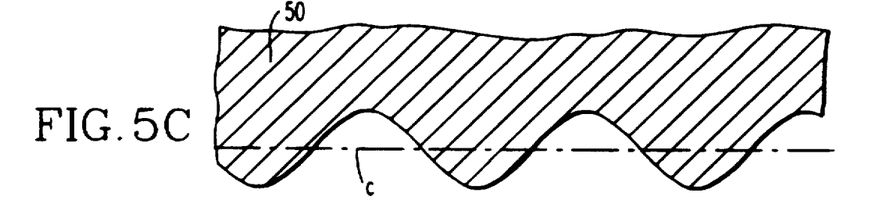
Figure 5D:
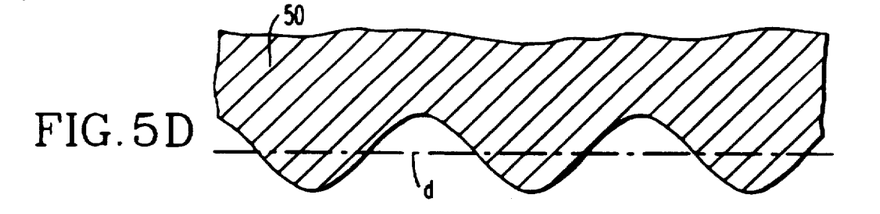
Figure 5G:
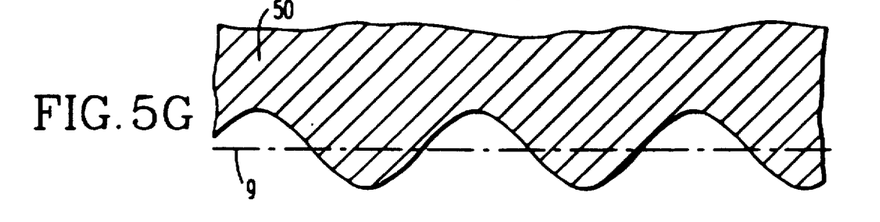
Figure 6:
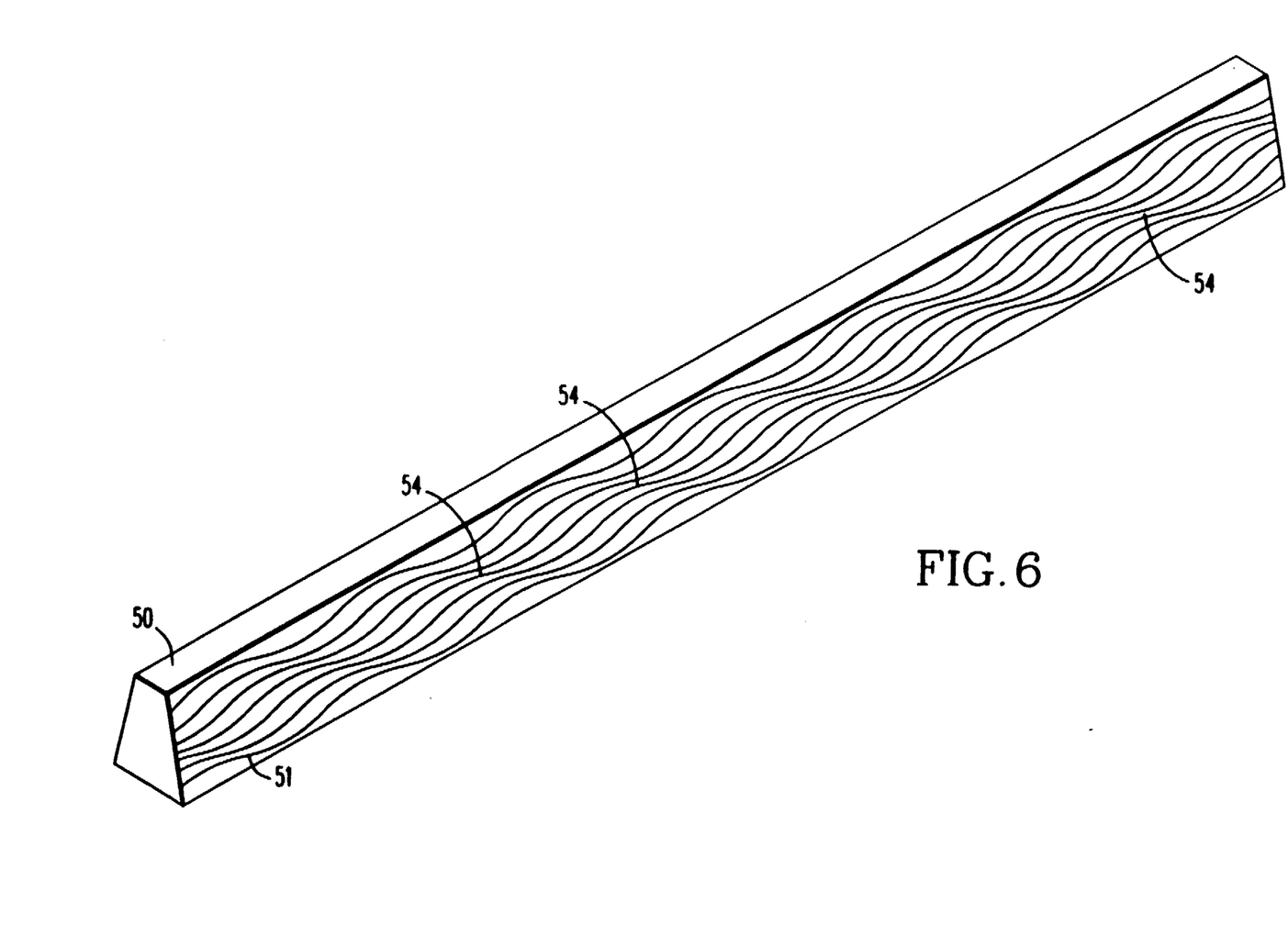
FIG. 6 illustrates a gear tooth showing an optical pattern which may be present due to undulation errors.

The effect of the undulation error may be visualized with reference now to FIGS. 4–6.

FIG. 4 conceptually illustrates a single gear tooth 50 having an idealized smooth flank 51 upon which are superimposed parallel lines a–g. FIGS. 5A–5G illustrate sections through the tooth at respective line locations a–g to show how the grinding process produces the periodic sinusoidal undulation which deviates from the idealized surface represented by the dotted line. The undulation error wavelength $\lambda$ is the distance between the peaks of the undulations. FIG. 5A–5G illustrate that the undulation is shifted in phase from one line to another and the collective result of such undulation and phase difference is illustrated in FIG. 6 wherein the undulations, superimposed upon the surface 51 of the gear tooth 50, actually results in a visual presentation of a plurality of dark bands 54 resulting from the phase-displaced valleys of the undulations across the surface 51.

Figure 7:
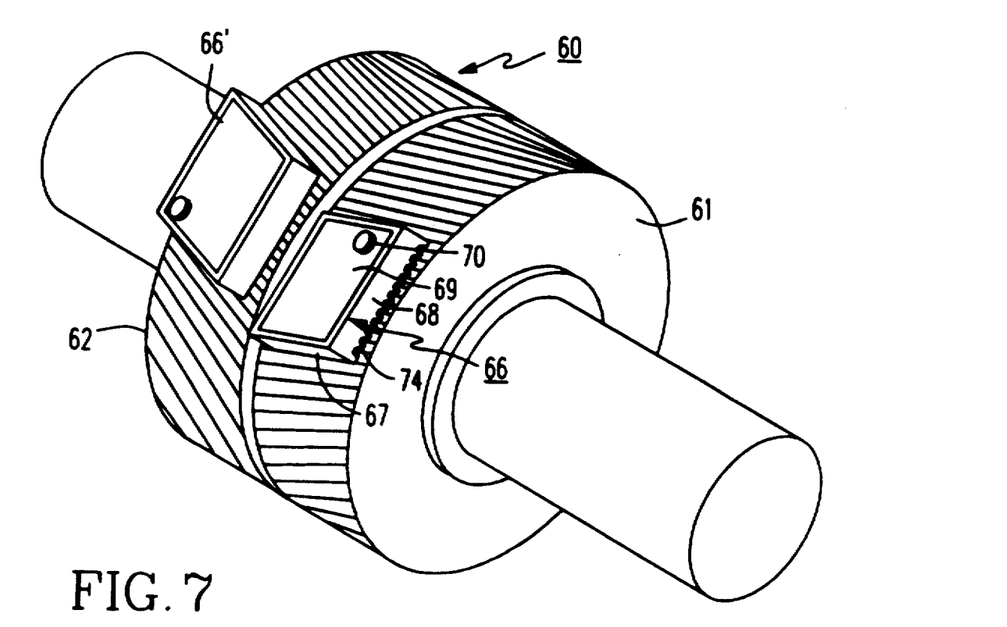
FIG. 7 is a view of an apparatus for forming a mold of the gear teeth.

For the present invention these undesired undulations are reduced to within acceptable super-precision gear tolerances defined by AGMA16 or DIN1 standards and without introducing undesirable imperfections. The first step in the process can be seen in FIG. 7 illustrating a large double helix bull gear 60 having left-hand and right-hand helixes 61 and 62. After the gear teeth have been cut, case hardened and ground, it may then be subject to the post grind finishing process of the present invention. The process is commenced with the formation of a mold to intimately match the space between gear teeth.

Figure 8:
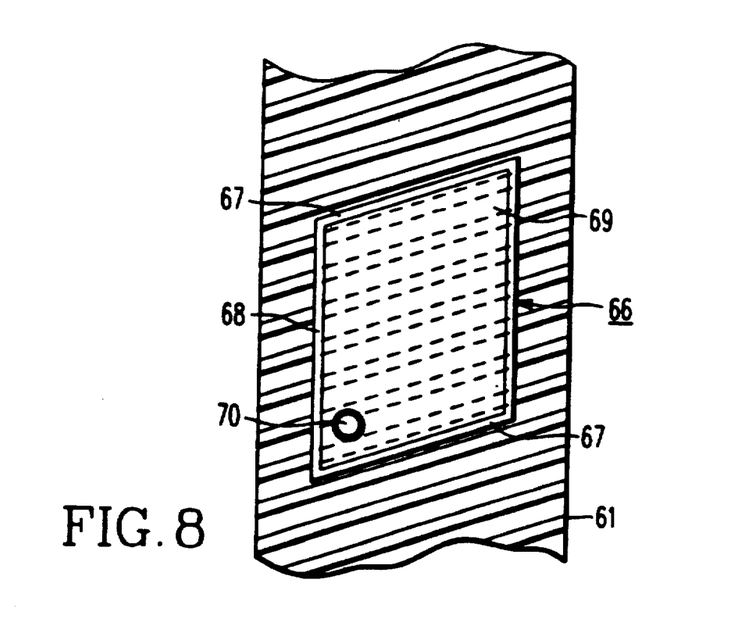
FIG. 8 is a plan view of the apparatus of FIG. 7.
Figure 9:
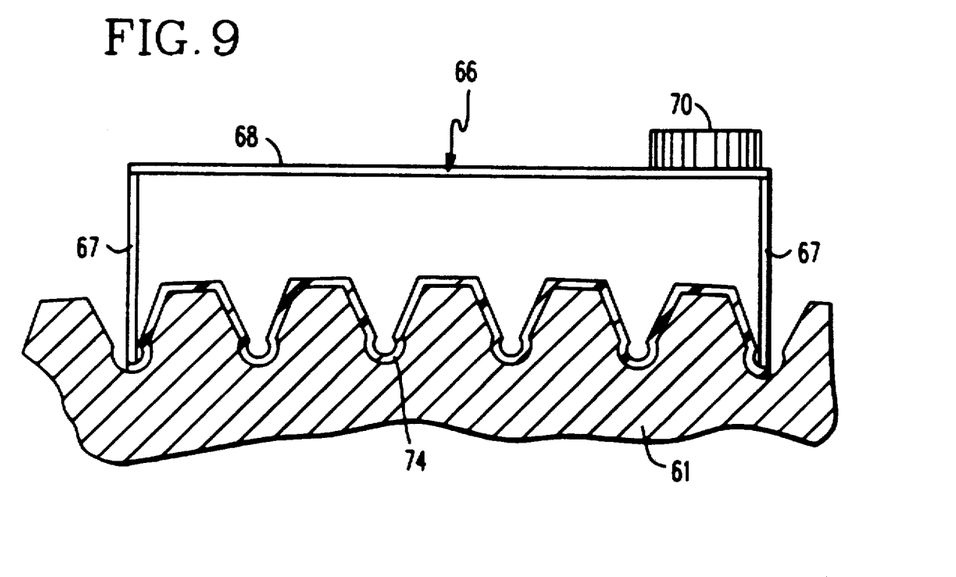
FIG. 9 is an end view of the mold forming apparatus of FIGS. 7 and 8.

With additional reference to the plan view of FIG. 8 and side view of FIG. 9, a form 66 is constructed having end sections 67, side sections 68 and a top portion 69. The end and the side sections may be made of an easily workable material such as wood, or the like, and so shaped as to straddle several gear teeth. The length of each end section 67 in accordance with the present invention, is at least equal to and preferably greater than, the aforementioned wavelength of the undulation error to be reduced.

Form 66 is held in position by means of clamps (not illustrated) and a molding compound is slowly introduced into the form via a pour spout 70. The molding compound which may be F2 produced by Devcon Corp. is suitably mixed and may be placed in a vacuum chamber as required to remove air bubbles from the compound. The compound is poured slowly into the form so as to assure that no air is trapped within. In order to better control the pouring process, the top 69 of form 66 may be of plexiglass. Prior to the positioning of form 66, the gear is coated with a releasing agent to insure that the molding compound does not bond to the tooth surface. To prevent molding compound leakage, a sealant 74, such as a room temperature vulcanized elastomeric compound may be used to seat the form 66 over the tooth area. A similar mold of the right-hand helix teeth 62 may be obtained utilizing the same procedures with form 66'.

Figure 10:
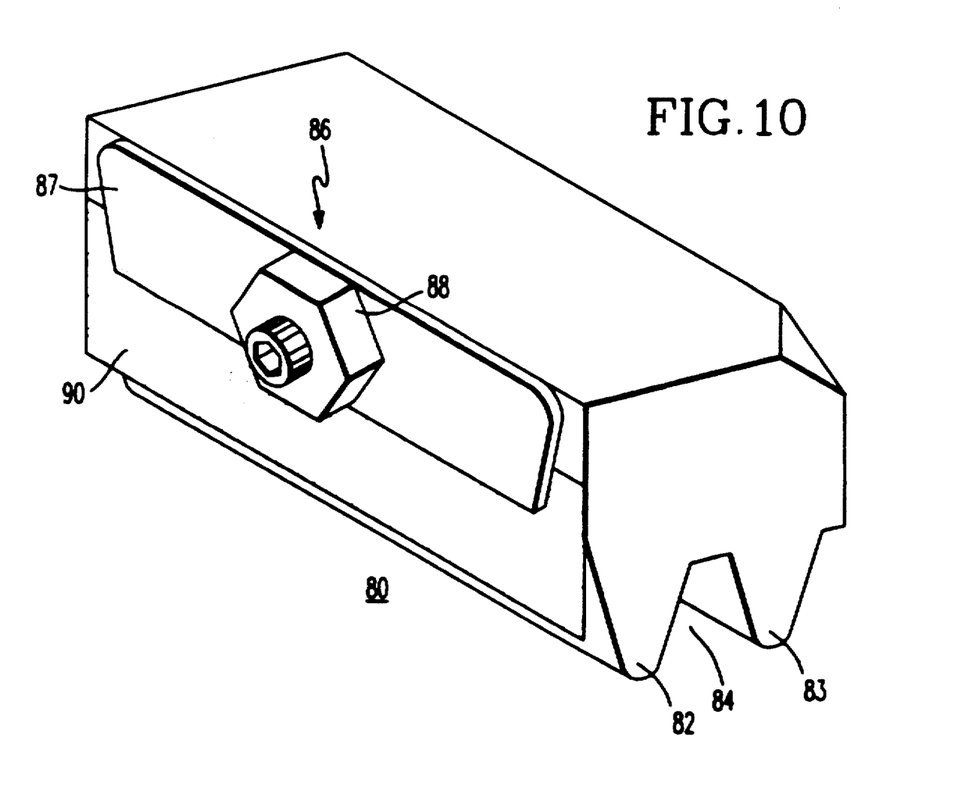
FIG. 10 is a view of the finished mold with attached microfinishing film.

After the molding compound has hardened, it may be removed from the form and cut and machined and protuberances may be removed, if present, to create one or more molds 80 as illustrated in FIG. 10. The mold includes 2 projections 82 and 83 each of which exactly matches and corresponds to the space between two teeth of the gear. In this regard, concave portion 84 of mold 80 exactly matches and corresponds to one gear tooth.

A clamping arrangement 86 is affixed to the upper side of projection 82 and includes, for example, a plate member 87 which is placed over a threaded projection (not shown) and onto which is threaded a nut 88. A thin sheet of microfinishing film 90 is placed into the clamping arrangement 86 and nut 88 tightened down as to retain the film 90 against the side of projection 82.

Figure 11:
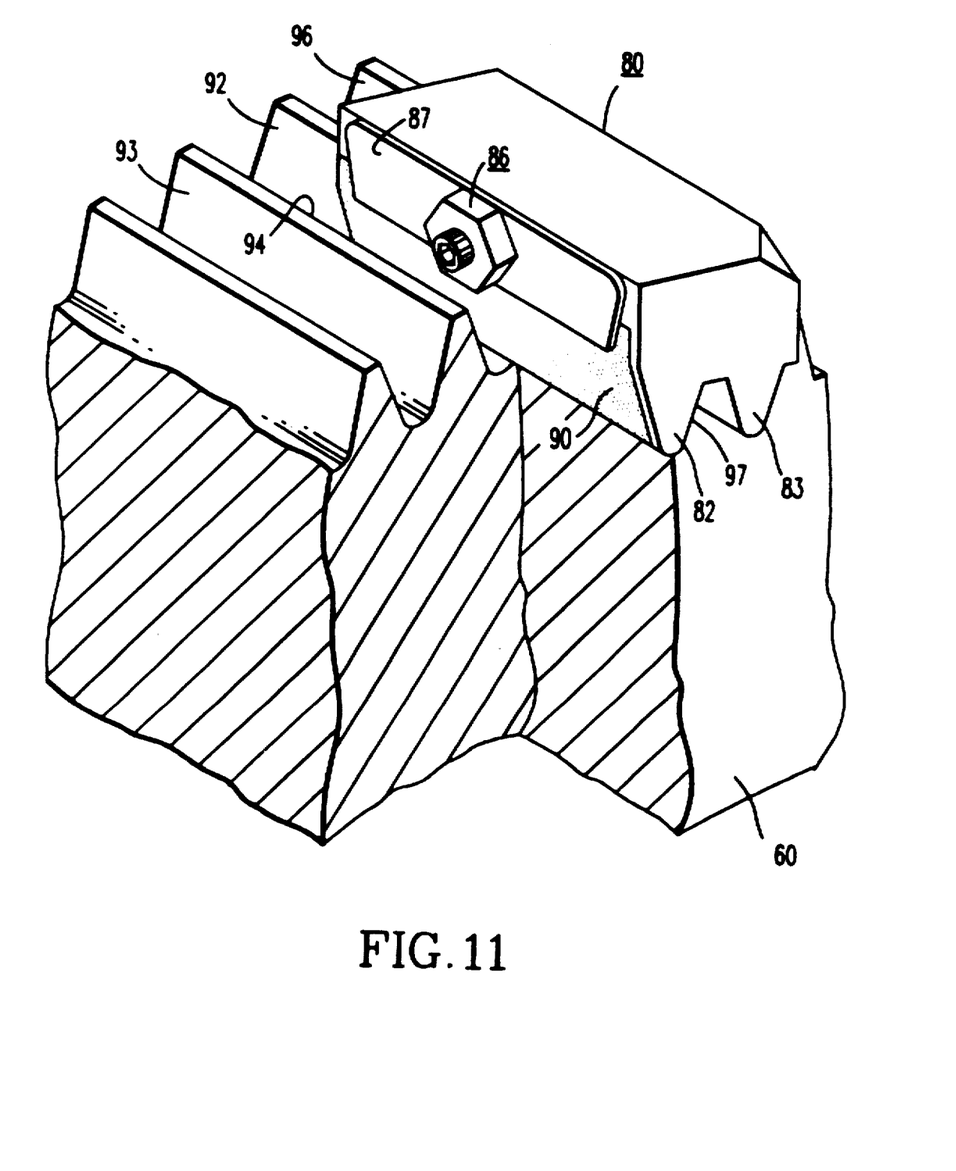
FIG. 11 illustrates the mold of FIG. 10 and its relationship to the teeth of a gear.

As illustrated in FIG. 11, the mold 80 with affixed microfinishing film 90 is then placed over a typical tooth 92 of the gear 60 such that microfinishing film 90 touches the adjacent tooth 93. More particularly, microfinishing film 90 contacts the tooth flank 94 having undulation errors to be reduced.

Multiple passes of the mold 80 over the tooth 92 are made such as by hand so as to reduce the undulation error on flank 94. The microfinishing film 90 is of the type which has a grit size so as to remove no more than approximately 2 to 3 millionths of an inch of gear material on each pass. A microfinishing film which meets this requirement is produced by the 3M Company, having their designation 262L, which is a 15 micron aluminum oxide microfinishing film. After approximately 3 or 4 passes, the mold is removed and the clamping arrangement 86 is loosened so that the microfinishing film 90 may be inverted in a manner that the film previously under the plate member 87 is now exposed to the flank 94. After 3 or 4 more passes, a new microfinishing film 90 is inserted and the process repeated. Approximately 40 to 80 passes (100 max) for each tooth surface is performed, however, most of the removal of the undulation peaks takes place in the first 20 to 40 passes.

After suitably finishing flank 94 of the tooth 93, mold 80 can then be placed over an adjacent tooth 96, to repeat the process with multiple replacements of microfinishing film 90, to smooth flank 97 of tooth 92 to a desired finish. In order to ensure that the microfinishing process is not inadvertently repeated on a finished tooth, each tooth is marked on the top land (using a white lacquer paint) in the center just prior to starting the tooth. When the tooth is finished, a second mark is made on the top land at one end. If the gear 60, in operation, is only turned in one direction, then only that flank of each tooth which mates with a corresponding tooth need be finished. If the gear is driven in two directions, then both flanks of each tooth should be processed in accordance with the present invention.

The mold 80 utilized in the process is initially formed or subsequently cut to a length at least equal to, and preferably somewhat greater than wavelength λ of the undulation error to be reduced. If the mold is of a length less than λ, then when practicing the process, if the mold is too short, it would have a tendency to follow the undulation as opposed to removing the peaks of the undulations, which are separated by a distance of λ. The process of the present invention insures that just a sufficient amount of the tooth surface is removed to reduce the undulation error without deleteriously affecting the tooth profile and other parameters, as would occur if heavier grit films or power grinding apparatus were utilized.

Figure 12:
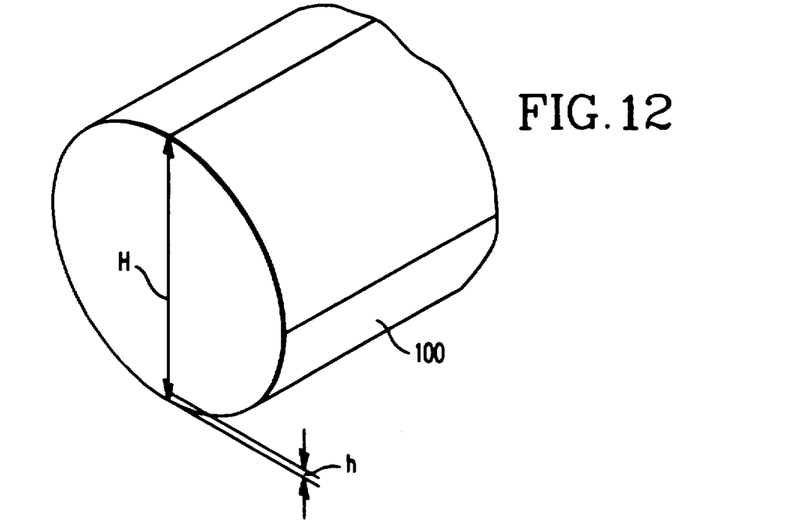
FIG. 12 is presented to demonstrate certain dimensions herein.

In a typical large helical gear for ship propulsion approximately 15 to 20 millionths of an inch of material is removed from each tooth flank upon which the process is performed. To visualize this small value, reference is made to FIG. 12 wherein numeral 100 represents a human hair having a diameter H, where H is approximately one thousandth of an inch. On this scale, the gear material removed by the present process is represented by the distance h where h may be 15 to 20 millionths of an inch.

Although a small amount of material is removed, it makes a significant difference in reducing the undulation error to within acceptable values for reducing the transmitted structureborne and airborne noise.

Figure 13A:
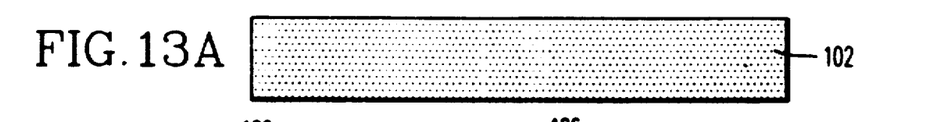
FIGS. 13A-13E illustrate the surface of the gear tooth with undulation errors during different phases of the post grinding method.
Figure 13B:
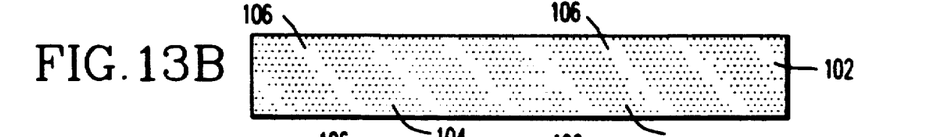
Figure 13C:
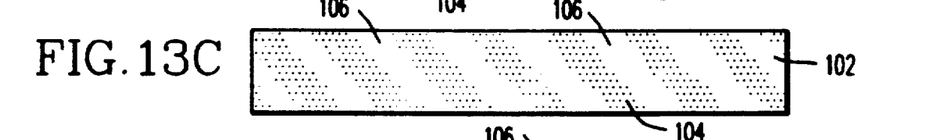
Figure 13D:
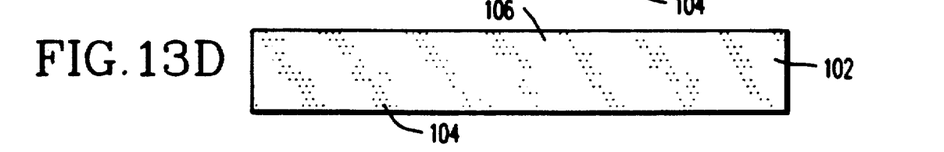
Figure 13E:
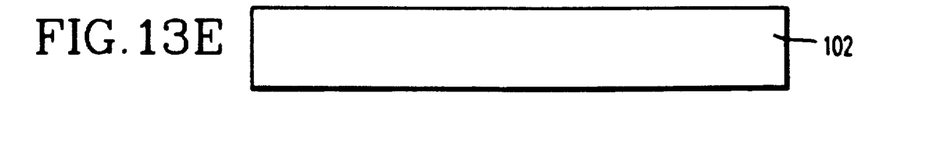

FIGS. 13A-13E illustrate a tooth flank 102 at different stages during the process. It has been mentioned that in addition to the index undulation error other errors are present. Some of these errors are random while others are periodic and include harmonics, of a significantly lower wavelength than that of the index undulation. All of these imperfections result in a tooth flank surface having a somewhat dull appearance as in FIG. 13A. As the process commences, and after approximately 20 passes, some of the imperfections are removed and the tooth flank, as illustrated in FIG. 13B, appears as a series of wide dark bands 104 and narrower, lighter shiny bands 106. In FIG. 13C after approximately 40 passes, the general width of the bands 104 have decreased while that of bands 106 have increased. In FIG. 13D after 60 passes, bands 104 have become relatively narrow lines while the remaining surface is shiny. After termination of the process, and as illustrated in FIG. 13E, the entire tooth flank 102 is shiny without the presence of any dark bands. In addition to the significant reduction of the undulation error, the process presents a shiny surface, as in FIG. 13E.

Figure 14A:
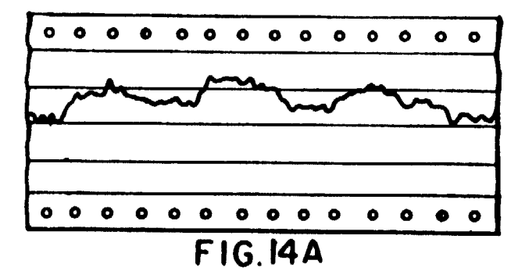
FIGS. 14A-14C illustrate undulation measurements taken along a sample gear tooth after a grinding process.
Figure 14B:
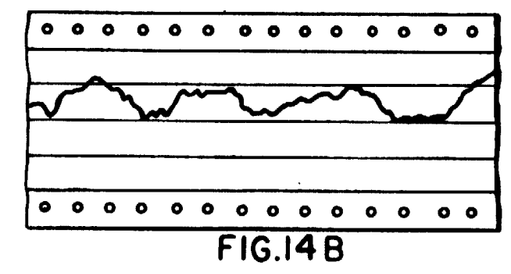
Figure 14C:
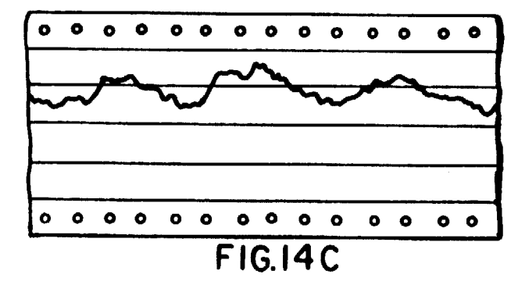

FIGS. 14A-14C represent typical measurements of a ground gear tooth surface as obtained with a Tomlinson WMT-1 three ball gauge. The measurements are taken at the root, pitch line and tip, respectively, of a helical gear tooth ground on a machine resulting in an undulation index wavelength of 2.07 inches along the helix.

Figure 15A:
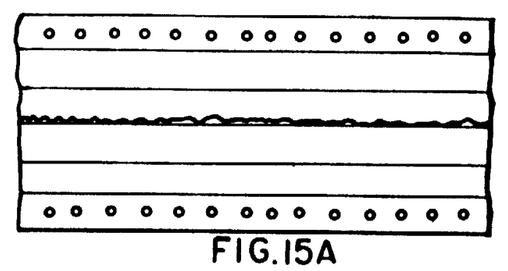
FIGS. 15A-15C illustrates the measurements as in 14A-14C, however, taken after the post-grinding process of the present invention.
Figure 15B:
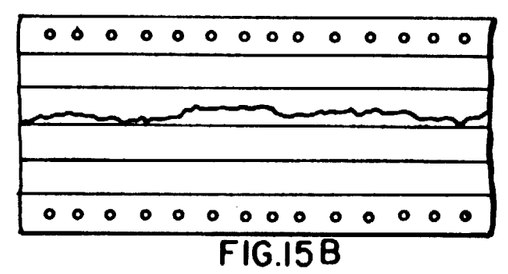
Figure 15C:
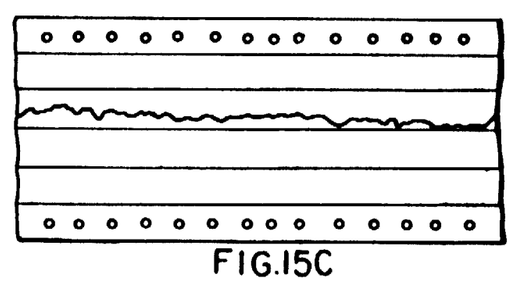

The finishing process in accordance with the present invention was performed on the tooth and FIGS. 15A-15C illustrate the results after 80 passes. These latter measurements, taken at the respectively same locations as in FIGS. 14A-14C illustrate a dramatic reduction in the surface irregularities resulting from the grinding process.

We claim:

1. A method of finishing a helical ground gear to reduce index undulation errors produced by the grinding process, comprising the steps of:
   a) pouring a molding compound over at least one tooth of said gear and into the space on either side of said tooth, and for a length greater than or equal to the wavelength of the undulation error to be reduced;
   b) allowing said molding compound to harden;
   c) removing said hardened molding compound to thereby obtain a mold of the space between said teeth;
   d) affixing to said mold a sheet of microfinishing film having a grit size so as to remove no more than about 2 to 3 millionths of an inch of gear material on each pass over a gear tooth;
   e) placing said mold with attached microfinishing film between two teeth of said gear so that said microfinishing film contacts the tooth surface having said undulation error;
   f) making multiple passes of said mold through said space;
   g) replacing said microfinishing film after a predetermined number of passes;
   h) repeating steps d through g until the undulation error on said tooth surface of the gear tooth in contact with said microfinishing film has been reduced to an acceptable value; and
   i) repeating steps d through h for other teeth of said gear.

2. A method according to claim 1 which includes the step of:
   a) making said multiple passes by hand.

3. A method according to claim 1 which includes the step of:
   a) replacing said microfinishing film after no more than 4 of said passes.

4. A method according to claim 1 which includes the step of:
   a) making said multiple passes in one direction only through said space.

5. A method according to claim 1 which includes the steps of:
a) affixing a clamp member to the side of said mold; and
b) inserting said microfinishing film into said clamp member in a manner so as to hold said microfinishing film against the side of said mold.

6. A method according to claim 1 which includes the step of:
a) constructing a form corresponding to the shape of a section of said gear;
b) placing said form on said gear; and
c) pouring said molding compound into said form.

* * * * *